United States Patent [19]

Nelson et al.

[11] Patent Number: 5,568,324
[45] Date of Patent: Oct. 22, 1996

[54] OVERHEAD PROJECTOR WITH CATADIOPTRIC FRESNEL LENS

[75] Inventors: John C. Nelson, Sea Ranch, Calif.; Robert M. Fesler; Dennis F. Vanderwerf, both of Austin, Tex.

[73] Assignee: Minnesota Mining and Manufacturing Company, St. Paul, Minn.

[21] Appl. No.: 445,092

[22] Filed: May 19, 1995

Related U.S. Application Data

[62] Division of Ser. No. 215,936, Mar. 21, 1994, Pat. No. 5,446,594, which is a division of Ser. No. 988,851, Dec. 21, 1992, Pat. No. 5,296,882.

[51] Int. Cl.$^6$ .................................................. G02B 3/08
[52] U.S. Cl. .................................................. 359/742
[58] Field of Search .................................................. 359/742

[56] References Cited

U.S. PATENT DOCUMENTS

| | | | |
|---|---|---|---|
| 2,003,804 | 7/1932 | Falge | 240/8.3 |
| 4,118,761 | 10/1978 | Dey | 362/297 |
| 4,337,759 | 7/1982 | Popovich et al. | 126/438 |
| 4,436,393 | 3/1984 | Vanderwerf | 353/38 |
| 4,741,613 | 5/1988 | Vanderwerf | 353/38 |
| 4,755,921 | 7/1988 | Nelson | 362/307 |
| 4,775,232 | 10/1988 | Fischbeck et al. | 353/38 |
| 4,859,043 | 8/1989 | Carel et al. | |
| 4,900,129 | 2/1990 | Vanderwerf | |
| 4,952,053 | 8/1990 | Behr | 353/65 |
| 4,969,733 | 11/1990 | Jewison | 353/119 |
| 5,097,395 | 3/1992 | Aho et al. | 362/32 |
| 5,150,966 | 9/1992 | Nelson | 362/337 |
| 5,161,057 | 10/1992 | Johnson | 359/566 |
| 5,317,349 | 5/1994 | Vanderwerf | 353/38 |
| 5,453,880 | 9/1995 | Vanderwerf | 359/742 |

FOREIGN PATENT DOCUMENTS

| | | | |
|---|---|---|---|
| 2537547 | 3/1976 | Germany | 359/742 |
| 3519506 | 12/1986 | Germany | G03B 21/132 |

OTHER PUBLICATIONS

Article entitled "A New Clue to color Correction," published Aug., 1976, in *Optical Spectra*, pp. 22–24.
Article entitled "Understanding Secondary color," published Jun. 1978, in *Optical Spectra*, pp. 44–46.
Article entitled "Achromatic and Sharp Real Imaging of a Point by a Single Aspheric Lens," published Oct. 15, 1983, in *Applied Optics* pp. 3242–3248.
Article entitled "Hybrid Diffractive–Refractive Lenses and Achromats," published Jul. 15, 1988 in *Applied Optics;* pp. 2960–2971.
Article entitled "Rear Projection System Features Ultra–Slim, 50–Inch Design," published Fall, 1992, in *Display Devices,* l pp. 34–37.
Article (undated) entitled "Chromatic Dispersion Compensation in a Fresnel Lens by Means of A Diffraction Grating."SPIE Brochure–"Nonimaaging Optics: Maximun Efficiency Light Transfer"– vol. 1528, Copyright 1991 by the Society of Photo–Optical Instrumentation Engineers.

*Primary Examiner*—Georgia Y. Epps
*Assistant Examiner*—Evelyn A. Lester
*Attorney, Agent, or Firm*—Gary L. Griswold; Walter N. Kim; Jack V. Musgrove

[57] ABSTRACT

A low-profile transmissive overhead projector employs a folded optical path and an off-axis Fresnel lens condensing system which includes a catadioptric lens element. This lens provides a fast condensing system which allows collimation, dispersion, or concentration of light striking the lens at a high angle of incidence, with efficient transmission to the far edge of the lens. This also enables additional reduction in the OHP base height by allowing the single mirror to be mounted at a flatter angle, with the light source still maintained at a position below (and adjacent) the stage. A novel catadioptric lens design further imparts achromaticity to the element, so that it may be constructed of any material, regardless of its index of refraction. The condensing system may have a single or doublet catadioptric lens.

3 Claims, 4 Drawing Sheets

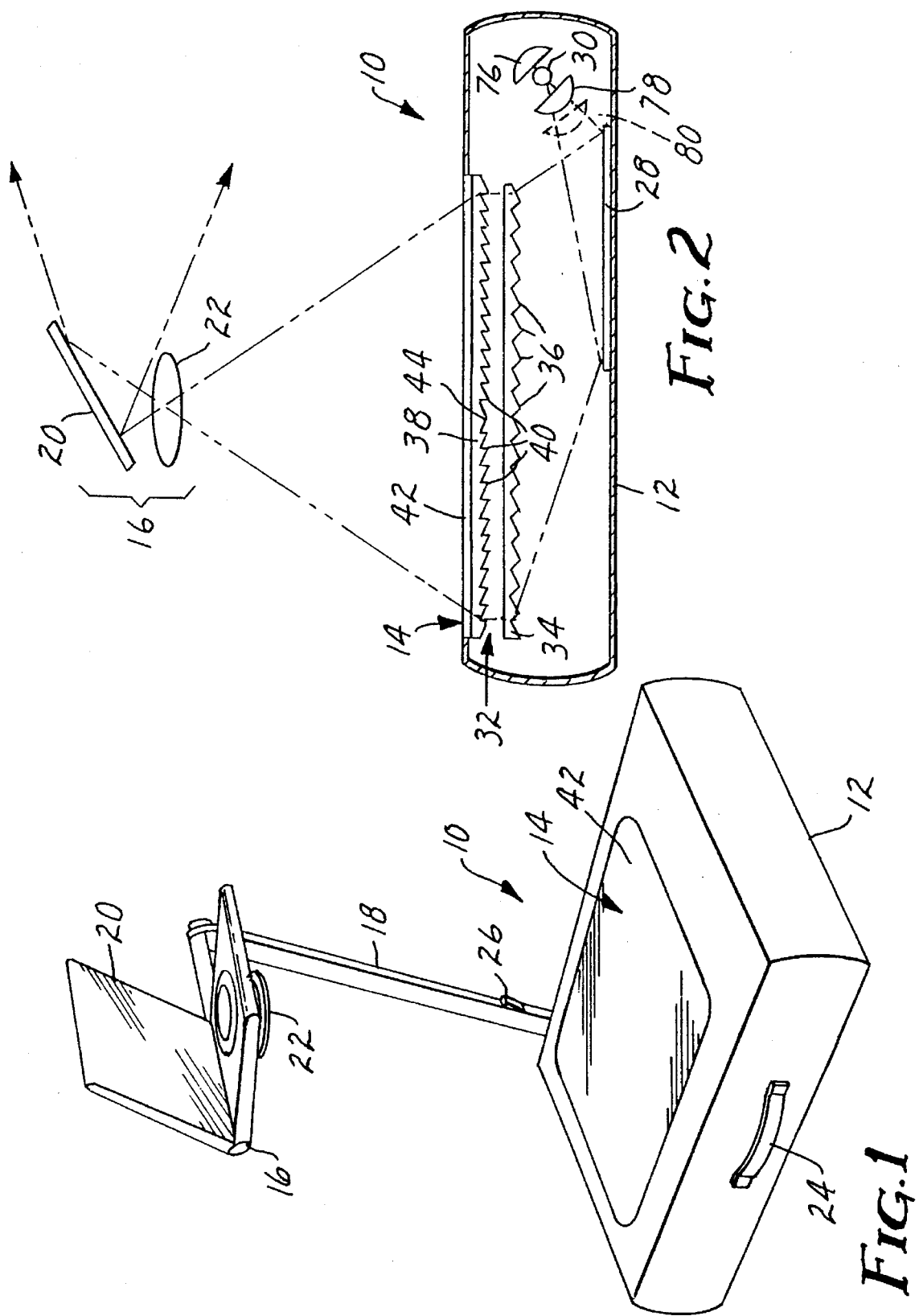

OVERHEAD PROJECTOR WITH CATADIOPTRIC FRESNEL LENS

This is a division of application Ser. No. 08/215,936 filed Mar. 21, 1994 U.S. Pat. No. 5,446,594 which is a divisional of Ser. No. 07/988,851 filed Dec. 21, 1992 now U.S. Pat. No. 5,296,882.

BACKGROUND OF THE INVENTION

1. Field of the Invention

The present invention generally relates to optical lenses and projection systems, and more particularly to an achromatic, catadioptric lens which may be used in a low-profile overhead projector.

2. Description of the Prior Art

Transmissive overhead projectors (OHP's) are known in the art, and are generally comprised of a base having a transparent stage area, a light source inside the base, a projection head mounted above the stage, and a condensing lens system located near the stage for directing the light towards the projector head. The condensing lens system often takes the form of a Fresnel lens or a two-element Fresnel lens combination, as depicted in U.S. Pat. No. 4,436,393, assigned to the assignee of the present invention, Minnesota Mining and Manufacturing Company (3M).

Several attempts have been made to decrease the base height of OHP's, for portability and reduced obstruction of the projected image during use. To achieve such a low-profile base, some machines collapse during storage or transportation, then expand open for actual use. Machines of this type are described, for example, in U.S. Pat. No. 4,969,733 and German Patent Application No. 3,519,506. These collapsible OHP's have several disadvantages, however, such as requiring additional parts which increase the complexity of the machine and add to its cost; the moving parts may also adversely affect alignment of the optical elements over time. Finally, there is no base height advantage of these machines over conventional OHP's when in operation.

Other attempts have been made to construct a low base height OHP without the need to collapse the base and optical elements. For example, U.S. Pat. No. 4,741,613 (assigned to 3M) employs a three-element refracting Fresnel lens system to allow the point light source to be very close to the stage. There are several aspects of this invention, however, which could be improved. The lamp is still positioned directly beneath the stage, and so closely that heat management at the stage is a significant problem. The requirement of three Fresnel lenses necessarily adds to the cost. Finally, this system does not adequately compensate for the diminished illumination near the periphery of the stage area.

The OHP's disclosed in U.S. Pat. Nos. 4,118,761 and 4,952,053 use folded optical paths to provide a more compact base. In the '761 patent, the light source is also "off-axis," meaning that the apparent location of the light source does not coincide with the center of the stage, i.e., the apparent location is displaced from the normal to the stage center. That device requires a complex optical system including a parabolic reflector to provide collimated light, two planar grooved reflectors, and the condensing lens assembly, and may exhibit a slightly darkened edge, furthest from the light source. In the '053 patent, the darkened edges are compensated for by providing two light sources. The twisted and curved mirrored, grooved prisms are also more difficult to fabricate than flat condensers. Finally, folded optical paths may create problems with full-size stage formats, such as European (A4) styles, since extremely tight folds such as are necessary to achieve a low-profile may cause the light source itself to interfere with the folded light path.

It should be noted that in each of these prior art OHP's, the actual or effective location of the light source (even when off-axis) is still located under the stage, i.e., it is inside the area defined by the condensing lens system.

The OHP of the present invention overcomes several of the above limitations by using a novel catadioptric lens. While the use of any catadioptric lens in an OHP is in itself novel, catadioptric lenses are known in other art areas. The term "catadioptric" refers to a lens which uses both reflection and refraction to redirect or bend light waves. See, e.g., U.S. Pat. Nos. 2,003,804, 4,859,043 and 5,097,395. As depicted in those patents, catadioptric lenses are useful in collimating light, similar to Fresnel lenses. In U.S. Pat. No. 5,150,966, a catadioptric lens is used to adjust light intensity distribution by discarding light. See also U.S. Pat. No. 4,755,921, which describes a single element catadioptric lens having increased efficiency at high entrance angles, thereby providing a "fast" lens (low f-number) that is suited for compact optical devices. Positioning of the lamp under the lens may, however, cause heat management problems with that design, particularly for high power lamps.

One problem with purely refractive lenses and catadioptric Fresnel lenses is chromatic aberration, caused by dispersion of the colors which pass through the lens. The dispersion is caused by the optical properties of the lens material, i.e., its index of refraction varies with the wavelength of the light passing therethrough. This effect is particularly exacerbated by a three-element refracting, condensing lens system, such as that shown in the '613 patent. There are several techniques, however, for minimizing this effect. For example, a limited number of wavelengths may be corrected by proper combination of positive and negative glass lens elements of differing dispersion. Attempts have also been made to minimize chromatic aberration in single element lenses, such as by providing discontinuous axisymmetric surfaces, or by using aspheric surfaces. Diffraction gratings may be placed on the lens, including on a Fresnel lens, as depicted in U.S. Pat. No. 5,161,057. See also U.S. Pat. No. 4,337,759, which describes a curved base, catadioptric Fresnel lens with a controlled amount of chromatic dispersion for use as a solar concentrator. Many of the foregoing techniques minimize dispersion only for selected wavelengths, as opposed to the full (visible) spectrum. Most of the techniques (including the '759 patent) also require materials having specific indices of refraction, to achieve a specific focal length with color correction.

In light of the foregoing, it would be desirable and innovative to design a catadioptric lens which is usable in a low-profile OHP. The lens would advantageously be achromatic and constructed of any number of light-transmissive materials having a large range of refractive indices, and efficiently focus the light to the projection lens of the OHP. The condensing system preferably would avoid the use of micro-precision diffraction gratings, and would generally minimize the number of optical elements (such as grooved mirrors), including the number of elements in the condensing lens, but still be compatible with a folded optical path.

SUMMARY OF THE INVENTION

The present invention provides a low-profile overhead projector generally comprising a base having a stage area, a projector head mounted to the base proximate the stage area, a light source adjacent to and below stage area, directed toward a simple mirror, and a condensing lens system which includes a catadioptric Fresnel lens element and a conventional refracting Fresnel lens. The light source is off-axis, and the catadioptric lens is de-centered, resulting in a fast lens which efficiently transmits light with high angles of incidence at the far edge of the lens. Location of the light source to the side of the stage facilitates cooling of the lamp, and avoids the use of any pure refraction to produce chromatic aberration.

The catadioptric lens may include a novel surface structure which makes it achromatic over all visible colors, and color correction is independent of the material used. A doublet catadioptric design is also disclosed for improved efficiency at lower angles of incidence.

BRIEF DESCRIPTION OF THE DRAWINGS

The novel features and scope of the invention are set forth in the appended claims. The invention itself, however, will best be understood by reference to the accompanying drawings, wherein:

FIG. 1 is a perspective view of one embodiment of the transmissive OHP of the present invention;

FIG. 2 is a side view of the OHP of the present invention schematically depicting the optical components thereof;

DESCRIPTION OF THE PREFERRED EMBODIMENT

Figure 3:
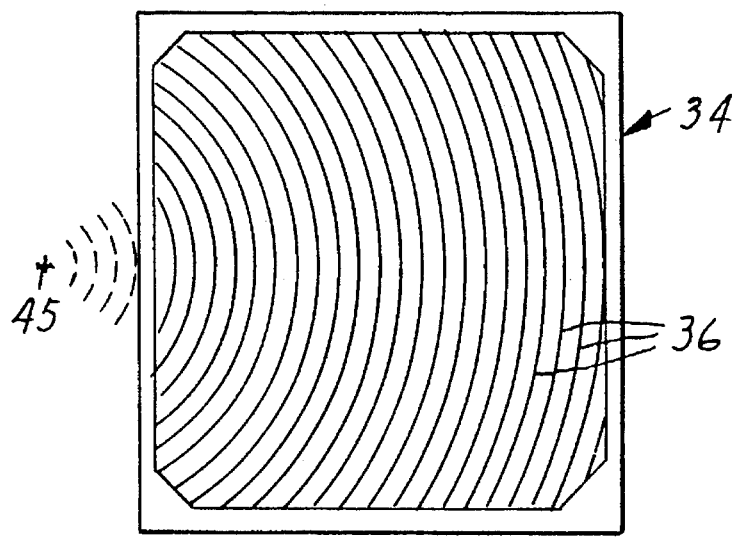
FIG. 3 is a bottom plan view of one embodiment of the catadioptric lens used in the present invention, illustrating the off-center orientation of the circular grooves therein.

With reference to the figures, and in particular with reference to FIG. 1, there is depicted one embodiment of the transmissive overhead projector (OHP) 10 of the present invention. OHP 10 is generally comprised of a base 12 having a stage area 14, and a conventional projector head 16 mounted to base 12 by arm 18. Base 12 may be constructed of any durable material, particularly a polymer such as a blend of polycarbonate and acrylonitrile butadiene styrene (ABS). Base 12 houses many standard components (not all shown), including a light source, a fan to cool the light source, a power control for the light source and motor, a manual switch for the power control, and a cable for connection to an external power supply. Projector head 16 includes a folding mirror 20 and a multi-element projection lens 22, preferably of the varifocal type having a focal length variation to control focus and screen size. Base 12 has a low profile which enhances the portability of OHP 10; other features for added portability include a carrying handle 24 (which may be on either side of base 12) and a latch 26 which allows arm 18 to pivot downwardly. Means (not shown) may be provided to releasably secure arm 18 in this compact storage/transportation position. Other conventional features may optionally be provided as deemed desirable.

With further reference to FIG. 2, it can be seen that OHP 10 employs a folded optical path using a simple, planar mirror 28 which reflects light from lamp 30 to the Fresnel condensing lens system 32 at stage area 14. In the particular embodiment shown, condensing lens system 32 includes a catadioptric Fresnel lens element 34 having a plurality of prisms or ridges 36, and a dioptric, or refractive, Fresnel lens element 38 having a plurality of ridges 40. In this application, catadioptric lens 34 serves to collimate the light prior to focusing of the light by refracting lens 38. Stage 14 may also include a writing platen 42, preferably a chemically strengthened (breakage-resistant) glass sheet, on top of Fresnel lens 38.

Those skilled in the art will appreciate that ridges 36 and 40 may be straight (parallel) if the light from lamp 30 is collimated prior to striking condensing lens system 32; in the preferred embodiment, however, ridges 36 and 40 are circular (or semi-circular). Interference patterns caused by the overlap of ridges 36 and 40 may be minimized by separation of the elements, and selection of groove width ratios which are between that of the upper and lower elements (see U.S. Pat. No. 4,900,129). As seen in FIG. 2, the radial center 44 of Fresnel lens 38 is preferably (but need not be) located within the borders of stage area 14, preferably coinciding with the geometric center of the stage. In contrast, the effective center 45 of catadioptric lens 34 lies outside of stage area 14 as shown in FIG. 3, i.e, catadioptric lens 34 is de-centered or off-axis. The effective center of catadioptric lens 34 is preferably positioned such that the effective position of lamp 30 is at the focal point of the catadioptric lens element. The amount of de-centering of catadioptric lens 34 is chosen to take advantage of the increased transmission of the catadioptric lens at steeper angles of incidence, where the light source is furthest from lens 34. Light transmission through catadioptric lens 34 increases with distance from its effective center, and exceeds 90% for angles of incidence between about 45° and 70°, which represents a significant improvement over purely refractive prior art elements. This tends to equalize the intensity of collimated light entering upper Fresnel lens 38 and even out the illumination more uniformly across stage area 14.

Figure 4:
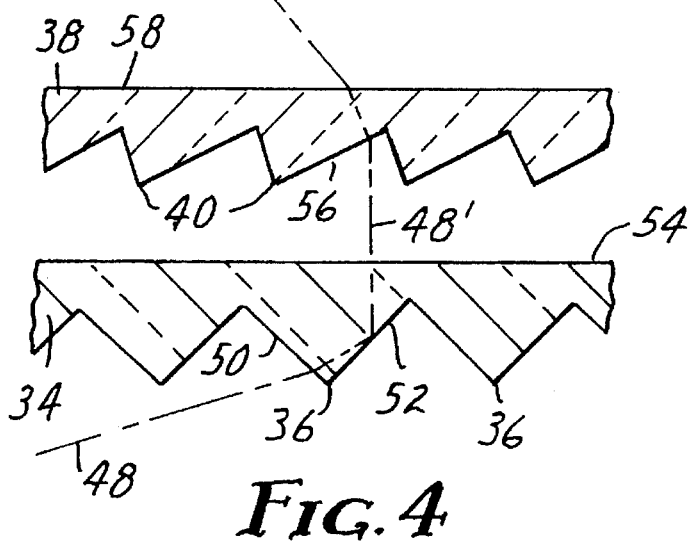
FIG. 4 is a cross-sectional detail view of one embodiment of the condensing lens system of the present invention, having separate catadioptric and refracting Fresnel lens elements.

Referring now to FIG. 4, the properties of catadioptric lens 34 may be understood by examining a ray 48 from lamp 30 impinging on lens 34. Ray 48 enters catadioptric lens 34 through one surface 50 of ridge 36, and is refracted at this surface. It then undergoes total internal reflection at surface 52, such that the redirected ray 48' exiting surface 54 is collimated with other light rays exiting surface 54. This collimated light is then refracted by dioptric Fresnel lens 38 at surfaces 56 and 58, toward lens 22. Provision of such a catadioptric lens 34 with refracting lens 38 permits the use of an off-axis light source at much higher angles of incidence as compared with prior art devices. This in turn allows the transmissive OHP to have a very low profile since the lamp can be positioned close to, yet outside of, stage 14, imparting essentially no additional height due to reflection of the light off horizontal mirror 28. Most lamps in folded optical systems are next to the stage, i.e., outside the volume defined by the normal projection of stage 14, but their apparent location (reflected image) still appears to be beneath the stage center; in OHP 10, however, this is not the case. Rather, the apparent location of lamp 30 is outside of this volume, and so the apparent location is not just off-axis but is further "off-stage". This location of lamp 30 complements the off-stage centering of ridges 36 of lens 34. Furthermore, low base height is achieved without collapsing base 12, although the height could be furthered lowered by providing a collapsible base and attendant optical components. OHP 10 is thus compact and very portable.

Figure 5:
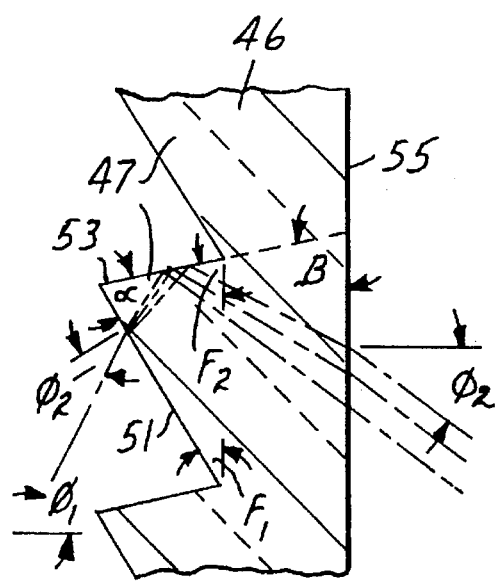
FIG. 5 is a cross-sectional detail view of the achromatic embodiment of the catadioptric lens of the present invention.

In FIG. 4, catadioptric lens 34 operates in a convergent mode, i.e., as a positive lens. It can further be made totally achromatic as illustrated in FIG. 5. The novel catadioptric lens 46 of FIG. 5 may be used in OHP 10 or with other optical systems. As with other prior art catadioptric lenses, lens 46 has a plurality of grooves defining prisms 47 of generally triangular cross-section. Lens 46 is novel, however, in that it essentially eliminates chromatic aberration over all (visible) wavelengths. This is accomplished by ensuring that the angle $\alpha$ between the refractive and reflective surfaces 51 and 53 is equal to the angle $\beta$ between reflective surface 53 and exit surface 55. For each groove set over the entire lens to be achromatic, $\alpha$ and $\beta$ must be selected according to the angle of incidence; specifically, these angles must conform to the equation:

$$\alpha = \beta = (\pi - \phi_1 + \phi_2)/2,$$

where $\phi_1$ is the angle between ray 48 and a line normal to surface 55, and $\phi_2$ is the desired angle of refraction of the exiting ray at surface 55. The angles $\phi_1$ and $\phi_2$ are easily calculated for each prism 47, since $\phi_1$ is a function of the location of lamp 30 with respect to a given prism 47, and $\phi_2$ is a function of the location of the desired focal point (lens 22). The geometry may also be expressed in terms of groove angles $F_1$ and $F_2$, where $F_1 = \phi_1 - \phi_2$, and $F_2 = (\pi - F_1)/2$. Provided this condition is satisfied, the angle $\phi_2$ is also the angle of incidence of ray 48 at surface 51, and the angle of refraction at surface 51 always equals the angle of incidence at surface 55 for all visible wavelengths; thus, lens 34 exhibits no effective dispersion.

A general property of catadioptric lenses is that they become very inefficient as both $\phi_1$ and $\phi_2$ approach zero, i.e., very near the (effective) center of the lens; conversely, however, they are particularly suited for off-axis collimation at high angles of incidence. While FIG. 5 illustrates some theoretical displacement of the color components of ray 48, this effect (greatly exaggerated in FIG. 5 for clarity) is negligible and, furthermore, does not technically constitute chromatic aberration since all wavelengths of a transmitted ray exit lens 46 at the same angle, i.e., the focusing properties of lens 46 are wavelength independent. This total wavelength independence means that practically any light-transmissive material may be used to construct the lens without changing its focusing properties; although the refractive index does have to be sufficiently high to assure total internal reflection, there are a wide variety of materials (representing a large range of refractive indices) which may be used.

Figure 6:
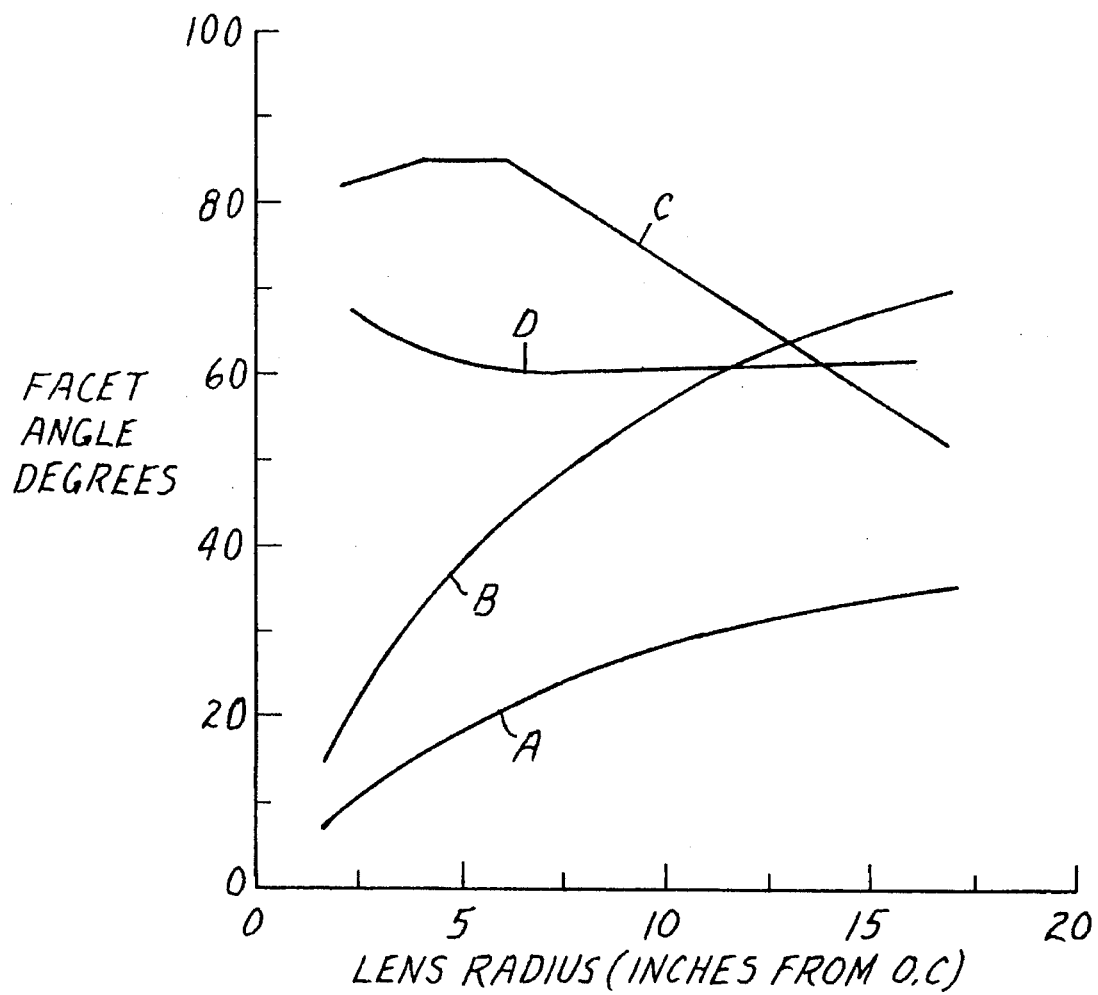
FIG. 6 is a graph showing the values of groove angles for an achromatic, catadioptric lens, and a chromatic, catadioptric lens having optimum collimated light transmission.

Achromatic, catadioptric lens 46 may be used in OHP 10, although this design is less efficient than that of lens 34. To provide collimated light (ray 48'), the angle $\phi_2$ is simply set to zero; this corresponds to the special case where the light has a normal angle of incidence at each surface 51, entirely eliminating the refractive characteristic of lens 46. In the application of a catadioptric lens to an OHP, however, maximum light transmission takes precedence over achromatization, and it has been empirically found that a chromatic lens design provides more efficient transmission of the light. FIG. 6 graphically shows the preferred groove angles of catadioptric lens 34 for the OHP application. Curves A and B represent, respectively, the values of groove angles $F_1$ and $F_2$ in an achromatic lens; curves C and D represent, respectively, the values of groove angles $F_1$ and $F_2$ in the preferred, chromatic, lens 34 used in OHP 10.

Figure 7:
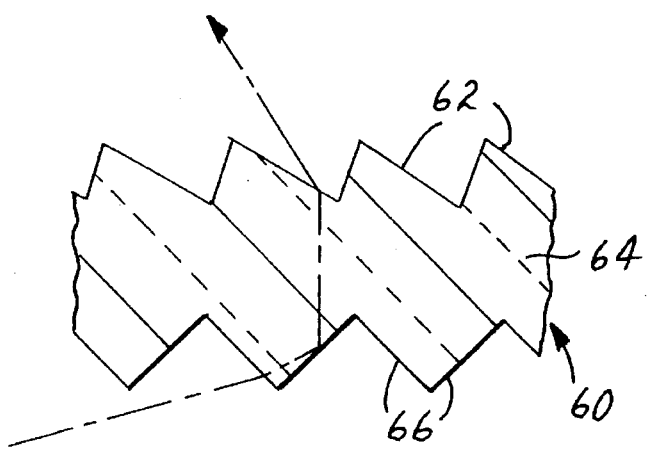
FIG. 7 is a cross-sectional detail view of one embodiment of the condensing lens system of the present invention, wherein the catadioptric and refracting Fresnel surfaces are combined on a single element.

Although the centered Fresnel lens 38 and the de-centered catadioptric lens 34 have been described as separate elements, it is possible to design and manufacture them as a single, integral element, as shown in FIG. 7. In this embodiment, the combined lens 60 is formed by pressing the grooves of the Fresnel lens into the top surface 62 of a sheet 64 of optical plastic (a thermoplastic resin such as polymethylmethacrylate), and the grooves of the catadioptric lens are simultaneously pressed into the lower surface 66 of sheet 64. Combined lens 60 is preferable over separate elements 34 and 38 since it eliminates two air/lens interfaces, resulting in an increase of approximately 8% in transmission of light across the condensing system.

Figure 8:
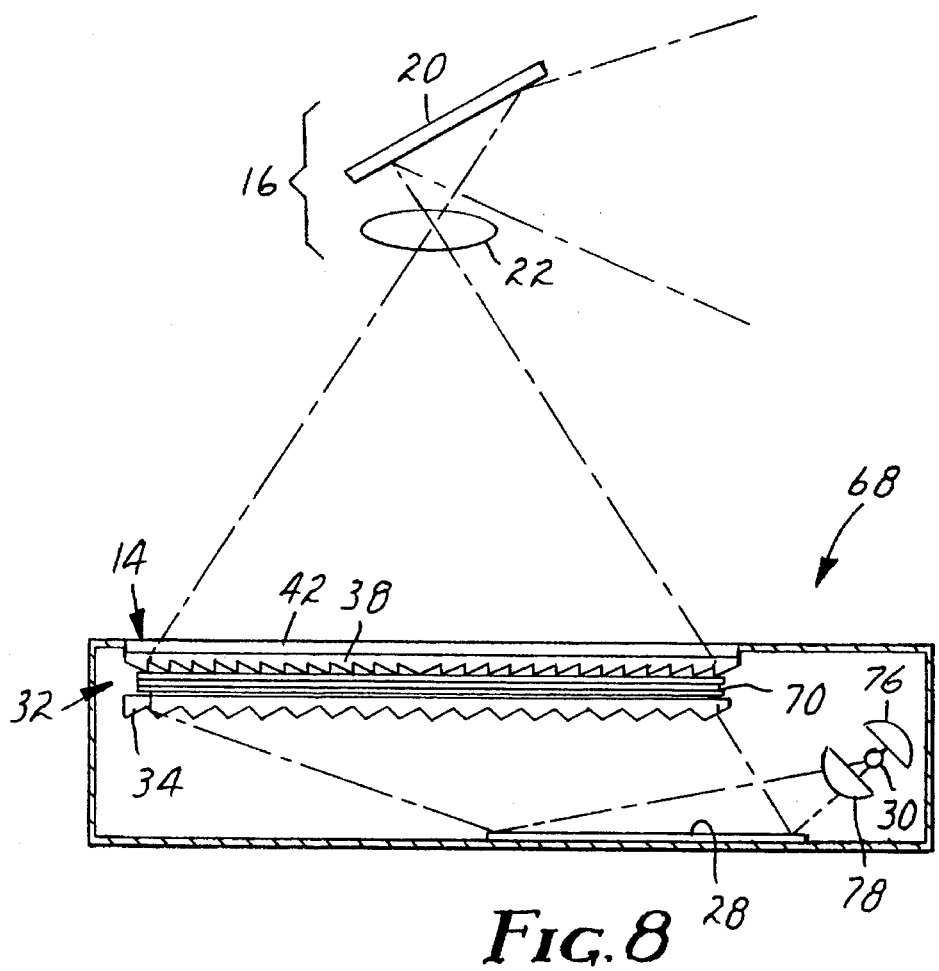
FIG. 8 is a side view of an alternative embodiment the OHP of the present invention having a liquid crystal display panel incorporated therein.

Another application for the collimated light region between the catadioptric and Fresnel structures relates to color liquid crystal display (LCD) panels. Many such conventional panels use a stacked design which requires collimated light in order to prevent parallax distortion of the colors. As shown in FIG. 8, a modified OHP 68 may be provided, having an LCD panel 70 disposed between the catadioptric and refracting Fresnel elements. It should also be noted that the off-stage disposition of lamp 30 facilitates cooling of lamp 30, since it is easier to control radiative and convective heating. This is particularly important in the LCD panel application since these panels are often very sensitive to heat.

Figure 9:
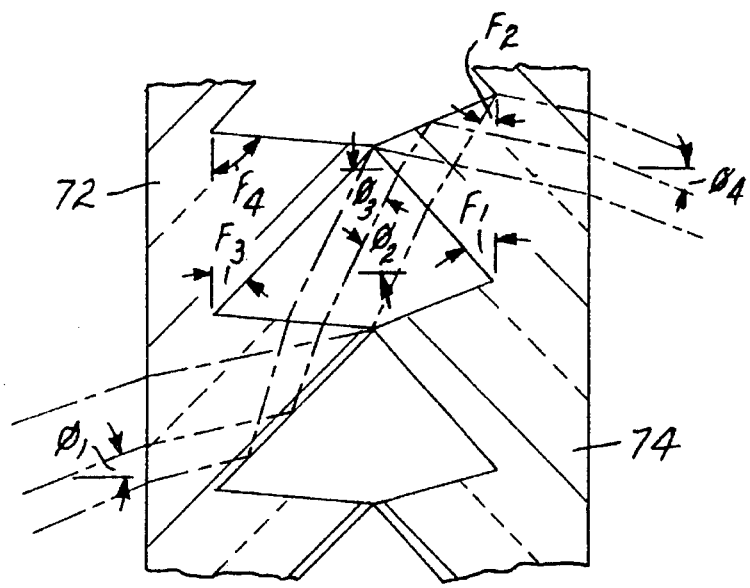
FIG. 9 is a cross-sectional detail view of a doublet, catadioptric lens made in accordance with the present invention.

Those skilled in the art will appreciate that an off-axis and/or achromatic catadioptric lens as taught in the present invention could be used in other optical systems with or without a Fresnel lens, and further that an achromatic, catadioptric lens may be provided which operates in a divergent mode, i.e., as a negative lens, by appropriate selection of angles $\alpha$ and $\beta$. In this regard, the present invention also contemplates a doublet lens design which combines a convergent catadioptric lens with a divergent catadioptric lens. As noted above, the convergent catadioptric lens as described has relatively poor efficiency for low angles of incidence, i.e., near the radial center of ridges 36. It has been found, however, that convergent and divergent lenses may be combined as shown in FIG. 9 to yield a doublet lens that is efficient at low incidence angles across its entire area (incident on the plano side of lens 72). In this embodiment, a divergent, catadioptric lens 72 is paired with a convergent, catadioptric lens 74, with the groove/prism structures of each lens facing each other; the prisms are aligned together, i.e., the peaks of the ridges of lens 72 are contacting the peaks of the ridges of lens 74. The groove angles are determined according to the following equations:

$$F_1 = \phi_3 - \phi_4,$$

$$F_2 = (\pi - F_1)/2,$$

$$F_3 = (\pi - F_4)/2,$$

$$F_4 = \phi_1 + \phi_2,$$

and $$\phi_2 = \phi_3$$

where $\phi_1$ is the entrance angle at the plano surface of lens 72 of a light ray from the light source, $\phi_2$ is the exit angle (measured with respect to a normal of this plano surface) of the light ray exiting one of the ridges of the structured surface of lens 72, $\phi_3$ is the entrance angle (measured with respect to a normal of the plano surface of lens 74) of the light ray exiting one of the ridges of the structured surface of lens 74, and $\phi_4$ is the desired exit angle of the light ray exiting the plano surface of lens 74. The result is a lens which is totally achromatic and highly efficient over all bend angles.

The present invention may be further refined by providing certain optional features. Referring back to FIG. 2, the light source includes a back reflector 76 and a lamp condenser lens 78. Lamp 30 may be de-centered or tilted with respect to condenser lens 78 in order to improve the off-axis illumination of condensing lens system 32. Additionally, an auxiliary cylindrical condenser lens 80 may be used in combination with a normal lens. In an off-axis lighting system, the light beam is elongated or elliptical, meaning that light may be wasted near the major sides of the elliptical light beam or, conversely, illumination will be darker near the minor sides of the beam. Use of auxiliary cylindrical lens 80 compensates for this effect, pulling the elongated beam back into a circular form (elliptically compressing the light beam), resulting in more even light distribution. The separate cylindrical and circular lenses could be combined into a single toroidal-type lens, or a non-rotationally symmetric aspheric lens. Finally, in the embodiment shown, projection lens 22 is directly over the center of stage area 14. The present invention may be modified, however, by shifting projector head 16 forward, as taught in U.S. Pat. No. 4,436,393, to minimize the keystone effect. This also requires shifting the center of ridges 40 forward, keeping projector head 16 directly over the optical center (axis) of Fresnel lens 38.

While the specific dimensions and optical parameters of OHP 10 may vary considerably depending upon the particular application, the following approximate values are considered exemplary. For an OHP having an A4 format (a stage area of about 285 mm×285 mm), a varifocal lens (having a focal length variation of 280 mm to 320 mm) is located 370 cm above stage 14. The centered circular dioptric Fresnel lens 38, having a focal length of 370 mm, and the off-axis circular catadioptric len 34, having a focal length of about 165 mm, are positioned directly beneath the glass stage. The transverse separation of the centers of the dioptric and catadioptric lenses is about 229 mm. Each lens is pressed in a 2 mm thick sheet of acyrlic plastic and has a groove frequency between 2 and 16 grooves per millimeter. The ratio of the groove frequencies between the upper and lower elements are chosen to minimize Moiré pattern interference between the two groove structures. A typical groove frequency ratio is 4.74:1. The lenses are packaged together and sealed along their perimeters, with a 1 to 2 mm spacing between plano surface 54 of lens 34 and ridges 40 of lens 38. Planar reflector 28 is placed 100 mm below glass sheet 42, parallel with lenses 34 and 38. A light source module, consisting of a plano-convex condenser with a focal length between 80 mm and 90 mm, an incandescent 400 watt, 36 volt lamp of the EVD type, and a back spherical reflector with a dichroic cold mirror coating, is positioned above mirror 28 to form a virtual image of lamp 30 165 mm below catadioptric lens 34. The effective base height of this exemplary OHP is about 100 mm to 115 mm, resulting in a very portable machine, particularly when the projection head is folded downward.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A doublet, catadioptric lens system comprising:

a first, divergent, catadioptric lens having a first plano surface and a first structured surface, said first structured surface having a plurality of prismatic ridges and grooves; and a second, convergent, catadioptric lens having a second plano surface and a second structured surface, said second structured surface having a plurality of prismatic ridges and grooves, and said second structured surface being located adjacent said first structured surface of said first lens, and said first and second lenses being generally parallel, to provide improved efficiency of the lens system at low incidence angles.

2. The doublet catadioptric lens system of claim 1 wherein:

the lens system is achromatic;

each of said ridges of said second lens have a reflective surface and a refractive surface, and define a first groove angle $F_1$ between said refractive surface and said second plano surface, and a second groove angle $F_2$ between said reflective surface and said second plano surface;

each of said ridges of said first lens have a reflective surface and a refractive surface, and define a third groove angle $F_3$ between said reflective surface and said first plano surface, and a fourth groove angle $F_4$ between said refractive surface and said first plano surface; and said groove angles generally conform to the equations $$F_1 = \phi_3 - \phi_4,$$

$$F_2 = (\pi - F_1)/2,$$

$$F_3 = (\pi - F_4)/2,$$

$$F_4 = \phi_1 + \phi_2,$$

and $$\phi_2 = \phi_3,$$

where $\phi_1$ is an entrance angle, at said first plano surface, of a light ray from the light source, $\phi_2$ is an exit angle, with respect to a normal of said first plano surface, of said light ray exiting one of said ridges of said first structured surface, $\phi_3$ is an entrance angle, with respect to a normal of said second plano surface, of said light ray exiting one of said ridges of said second structured surface, and $\phi_4$ is a desired exit angle of said light ray exiting said second plano surface.

3. The doublet catadioptric lens system of claim 1 wherein:

said ridges in said first lens are aligned with said ridges in said second lens; and said ridges in said first and second lenses are circular and concentric, defining an effective center which lies outside of the lens system.

\* \* \* \* \*